United States Patent [19]

Remblier

[11] Patent Number: 5,195,710
[45] Date of Patent: Mar. 23, 1993

[54] THREE-DIMENSIONAL FIXING DEVICE

[75] Inventor: Michel Remblier, Auvers Sur Oise, France

[73] Assignee: Alcatel Telspace, France

[21] Appl. No.: 782,471

[22] Filed: Oct. 25, 1991

[30] Foreign Application Priority Data

Oct. 30, 1990 [FR] France ............... 90 13451

[51] Int. Cl.$^5$ .............................................. A47K 1/00
[52] U.S. Cl. ..................................... 248/300; 248/201;
   248/216.4; 248/675
[58] Field of Search ............... 248/216.1, 216.4, 217.2,
   248/300, 911, 912, 205.1, 675, 201; 403/403,
   382, 205

[56] References Cited

U.S. PATENT DOCUMENTS

| | | |
|---|---|---|
| 2,667,318 | 1/1954 | Sesler . |
| 2,676,778 | 4/1954 | Pace et al. ........................ 248/300 |
| 2,960,806 | 11/1960 | Kunzler . |
| 3,588,019 | 6/1971 | Cozeck ........................ 248/205.1 X |
| 4,251,819 | 2/1981 | Vickland . |
| 4,390,172 | 6/1983 | Gotman . |
| 4,690,359 | 9/1987 | Phillips ............................ 248/300 |
| 4,896,985 | 1/1990 | Commins ..................... 403/403 X |
| 5,016,873 | 5/1991 | Bossa .............................. 403/403 X |

FOREIGN PATENT DOCUMENTS

| | | |
|---|---|---|
| 1234288 | 2/1967 | Fed. Rep. of Germany . |
| 0492526 | 7/1919 | France . |
| 1551730 | 8/1979 | United Kingdom . |
| WO80/01366 | 7/1980 | World Int. Prop. O. . |

Primary Examiner—Ramon O. Ramirez
Attorney, Agent, or Firm—Sughrue, Mion, Zinn, Macpeak & Seas

[57] ABSTRACT

A device for fixing a first element in three dimensions relative to a second element, the device including at least one connecting member extending between two connections. At least one of the connections is constituted by a fixing component of said member and at least one abutment component. The invention is particularly suitable for application to microwave beam transmission.

9 Claims, 3 Drawing Sheets

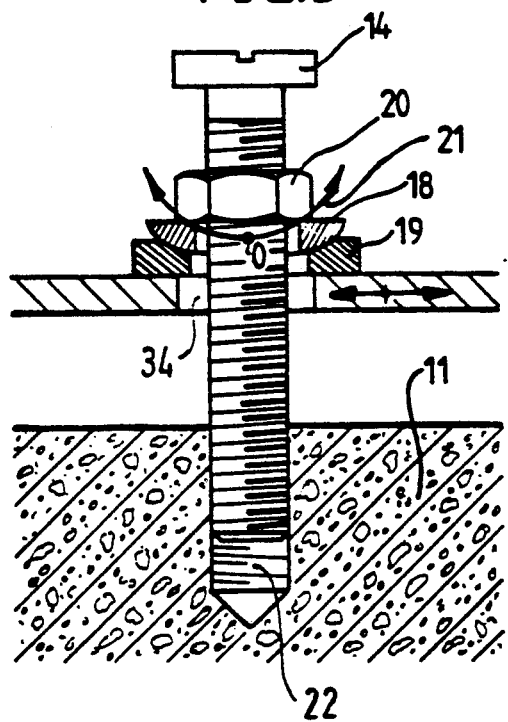
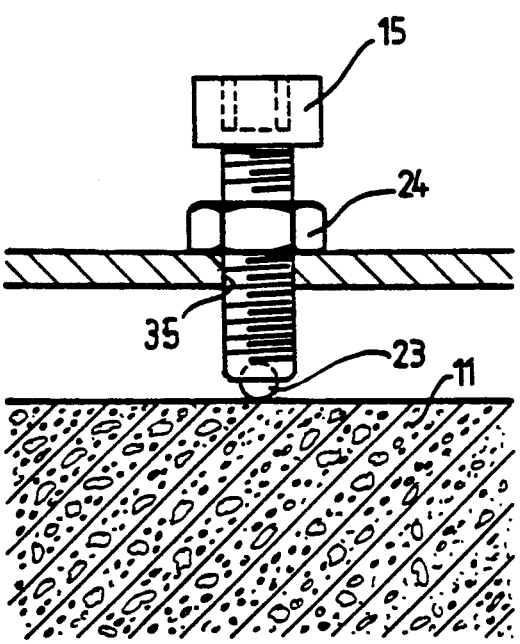
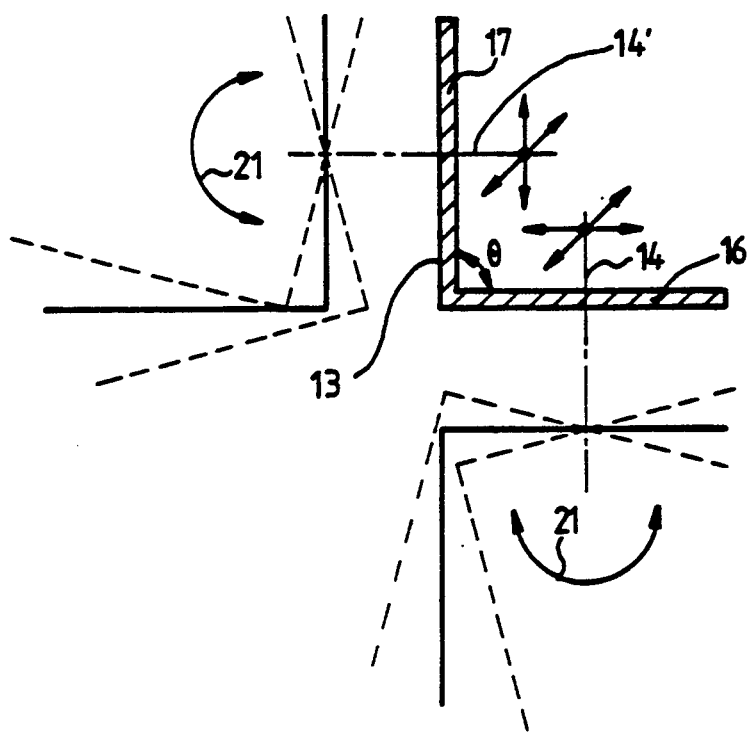

THREE-DIMENSIONAL FIXING DEVICE

The invention relates to a three-dimensional fixing device.

BACKGROUND OF THE INVENTION

As described in European patent application EP-A-0 274 084, it is known to interconnect two elements by means of a connecting member and a plurality of screws.

In the special case of microwaves, it is necessary to achieve accurate positioning of microwave modules and of waveguides that are of arbitrary shapes. It is also important to be able to dismantle such parts, possibly while retaining a record of the optimum position.

An object of the invention is to achieve this target.

SUMMARY OF THE INVENTION

To this end, the present invention provides a device for fixing a first element to be positioned in three dimensions relative to a second element, the device comprising at least one support piece acting as a connecting member between two connections: a first with the first element; and a second with the second element; wherein the support piece is in the form of a bracket comprising two arms at a determined angle relative to each other; each of the arms being pierced by holes in which fixing and abutment components can be inserted; at least one fixing component and at least three abutment components being installed on each of said arms for the purpose of implementing each of said two connections.

Advantageously, this device makes it possible to hold microwave elements, waveguides, or other elements, in three dimensions in a rigid position without mechanical stress and without particularly accurate machining, while retaining the option of keeping a record of said position in the event of said element being dismantled and reassembled, or else without keeping a record of the position if an existing element is removed and replaced by a new element.

BRIEF DESCRIPTION OF THE DRAWINGS

An embodiment of the invention is described by way of example with reference to the accompanying drawings, in which:

FIGS. 2 to 5 show various aspects of the fixing device of the invention; and

DETAILED DESCRIPTION

Figure 1:
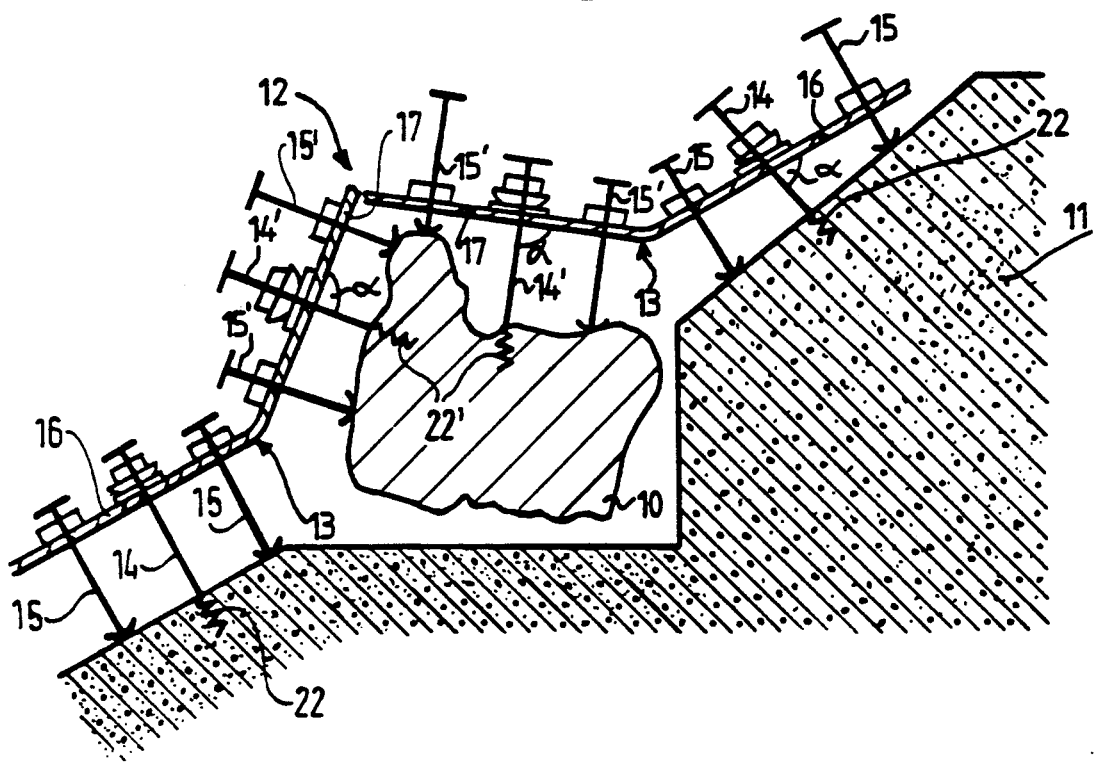
FIG. 1 is a diagram of the fixing device of the invention.

FIG. 1 is a diagram showing how an element 10 of arbitrary shape can be fixed relative to a structure 11 by means of a device 12 of the invention.

The device 12 comprises at least one bracket-shaped rigid support piece 13, there being two such pieces in this case. Each piece thus comprises two arms 16 and 17, as shown in FIG. 1, with each face of each piece having the following installed thereon:
one fixing component 14 (14'); and
three abutment components 15 (15').

The fixing and abutment components 14 and 15 associated with the first arm 16 of said piece 13 bear against the structure 11. The fixing and abutment components 14' and 15' associated with the second arm 17 of said piece 13 bear against the element 10 that is to be positioned.

Thus, the support piece 13 acts as a connecting member between two connections: one with the structure 11 and the other with the element 10 to be positioned.

Figure 2:
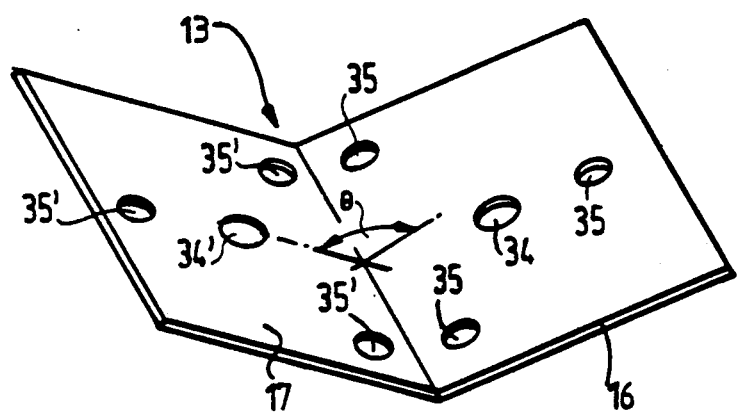

The support piece 13 shown in FIG. 2 is bracket-shaped, having two arms 16 and 17 that are at an obtuse or an acute angle $\theta$ to each other. Each of the arms 16 and 17 is pierced by holes 34 and 35 (34', 35') in which the fixing and components 14, 14' abutment components 15, 15' can be inserted. However, the piece may be of any other shape so long as it has two plane portions making said angle $\theta$ with each other, and on which the various components 14 and 15 (14', 15') are installed.

The points of contact between the three associated abutment components (15) or (15') and the structure 11 (or the element 10 to be positioned) make it possible to define one adjustment plane, and one only.

When positioning the element 10 relative to the structure 11, the fixing components 14 and 14' and the abutment components 15 and 15' are installed and adjusted in succession, in traction or in thrust as the case may be.

When dismantling the element 10, if it is desired to retain a mechanical record of the position obtained, it is necessary to store the positions of the abutment components 15 and 15'.

In one embodiment, FIG. 3, the fixing components 14 and 14' are screws bearing against respective first and second spherical washers 18 and 19, the washer 18 having a concave surface while the washer 19 has a convex and the first washer 18 engages a lock nut 20. Such a screw 14, 14' is thus free to pivot about a point O situated on its axis of symmetry with the spherical face of the first washer 18 then sliding over the spherical face of the second washer 19 with an motion 21 as shown in FIGS. 3 and 5. One such screw 14 or 14' is thus inserted in corresponding tapping 22 or 22' formed in the structure 11 or in the element 10.

The abutment components 15 and 15' are screws having spherical tips or bal tips 23, and are provided with lock nuts 24 between the head and the support piece 13.

As shown in FIG. 1, these various screws are installed on the two arms 16 and 17 of the two support pieces 13 which are made of folded or welded sheet metal.

As shown in FIGS. 1 and 5, the fixing screws 14 and 14' serve to keep a constant gap between the first arm 16 and the structure 11, and between the second arm 17 and the element 10, without applying stress.

The abutment screws 15 and 15' take up any defects in parallelism and differences in shape between the element to be held and the support piece 13.

The "position recording" function is performed by these abutment screws 15 and 15' and their respective lock nuts. This function is essential for making it possible to reinstall an element that has recently been removed without there being any need to adjust the element all over again. This function can be eliminated by loosening the lock nuts on the abutment screws 15 and 15', thereby making it possible, for example, to install a new element 10 that is different in shape.

Figure 6:
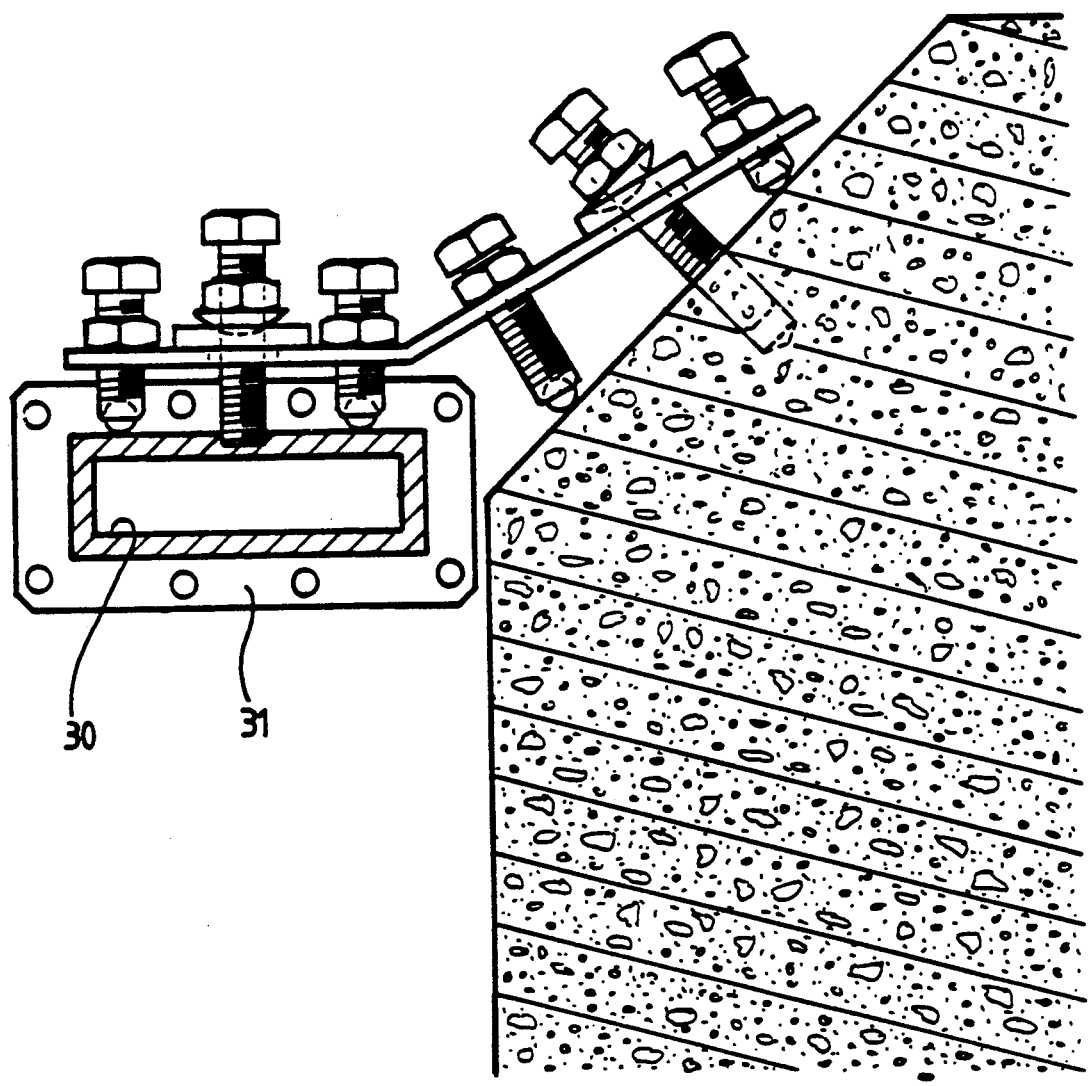
FIG. 6 shows an embodiment of the device of the invention.

FIG. 6 shows an example of how the device of the invention can be used in the field of microwaves. The element 10 to be positioned is a rectangular section waveguide 30 having a fixing flange 31. The device of the invention is then highly advantageous since the inside dimensions of such a microwave waveguide need to be very accurate with respect to its inside walls. The same does not apply to its outside walls. When a waveguide is to be removed or be replaced, prior art devices have required adjustments to be performed all over again because of the accuracy requirements. This does not apply with the device of the invention.

Naturally, the present invention is described and shown merely by way of preferred example, and its component parts could be replaced by equivalent parts without thereby going beyond the scope of the invention.

We claim:

1. A device for fixing a first element to be positioned in three dimensions relative to a second element, the device comprising at least one support piece acting as a connecting member between a first connection with the first element and a second connection with the second element; wherein said at least one support piece is in the form of a bracket comprising two arms at a determined angle relative to each other; each of the arms being pierced by at least four spaced holes including an inner hole and at least three outer holes about said inner hole for insertably receiving fixing and abutment components; and at least one fixing component being insertably installed in said inner hole, and at least three abutment components being insertably installed respectively in the three outer holes on each of said arms thereby fixing a respective arm to a respective one of said first and second elements for the purpose of implementing said two connections.

2. A device according to claim 1, wherein the second element is a structure.

3. A device according to claim 1, wherein said at least one support piece comprises two support pieces.

4. A device according to claim 1, wherein each fixing component is a screw passing through said inner hole and being mounted on the support piece to pivot about a point on its axis of symmetry.

5. A device according to claim 4, wherein said fixing screw co-operates with a convex spherical first washer having a convex face fixed on the corresponding support piece and with a second washer having a concave face slidably receiving the convex face of the first washer.

6. A device according to claim 5, wherein said fixing screw carries a lock nut between a head of the fixing screw and said first washer.

7. A device according to claim 1, wherein each abutment component is a screw whose tip includes a spherical bearing surface.

8. A device according to claim 7, wherein each abutment screw carries a lock nut engaging a face of the support piece opposite to that facing one of said first and second elements.

9. A device according to claim 1, wherein the element to be positioned is a waveguide or a microwave module.

* * * * *